United States Patent
Kuramoto et al.

(10) Patent No.: US 8,205,701 B2
(45) Date of Patent: Jun. 26, 2012

(54) OPERATING SYSTEM FOR TRACTOR

(75) Inventors: Takashi Kuramoto, Sakai (JP);
Masashi Osuga, Nara (JP); Hiroshi Shimada, Nara (JP); Yoshio Tomiyama, Osaka (JP); Takeshi Komorida, Sakai (JP); Hironobu Nishihara, Sakai (JP); Kenji Nishihara, Nara (JP); Takashi Shibata, Sakai (JP)

(73) Assignee: Kubota Corporation, Osaka (JP)

( * ) Notice: Subject to any disclaimer, the term of this patent is extended or adjusted under 35 U.S.C. 154(b) by 486 days.

(21) Appl. No.: 12/497,972

(22) Filed: Jul. 6, 2009

(65) Prior Publication Data
US 2009/0266639 A1    Oct. 29, 2009

Related U.S. Application Data

(63) Continuation of application No. 11/375,373, filed on Mar. 14, 2006, now Pat. No. 7,558,658.

(30) Foreign Application Priority Data

Apr. 28, 2005 (JP) ................... 2005-131527
Jun. 30, 2005 (JP) ................... 2005-191604

(51) Int. Cl.
*B60R 16/04* (2006.01)
*B60K 11/04* (2006.01)
*B60K 5/00* (2006.01)
(52) U.S. Cl. .............. 180/68.5; 180/68.4; 180/291
(58) Field of Classification Search ............ 180/291, 180/68.5, 68.4, 68.6
See application file for complete search history.

(56) References Cited

U.S. PATENT DOCUMENTS

| 5,113,819 A | * | 5/1992 | Murakawa et al. | 123/198 E |
| 5,660,244 A | * | 8/1997 | Matsuda | 180/68.1 |
| 5,678,648 A | * | 10/1997 | Imanishi et al. | 180/68.1 |
| 5,887,671 A | * | 3/1999 | Yuki et al. | 180/68.1 |

FOREIGN PATENT DOCUMENTS

| JP | 58131236 A | 8/1983 |
| JP | 58193432U1 A | 12/1983 |
| JP | 60-084433 U1 | 6/1985 |
| JP | 63065572 A | 4/1988 |
| JP | 3-014411 Y | 3/1991 |
| JP | 4110406 U | 9/1992 |
| JP | 04346703 A | 12/1992 |
| JP | 11034924 | 2/1999 |
| JP | 2003182593 | 7/2003 |
| JP | 2003237642 | 8/2003 |

* cited by examiner

*Primary Examiner* — John R Olszewski
(74) *Attorney, Agent, or Firm* — The Webb Law Firm

(57) ABSTRACT

An operating system for a tractor to which an implement is attachable, the operating system comprises: a steering wheel provided rearwardly of a hood that houses an engine located in a forward region of the tractor; a control panel provided rearwardly of the hood and adjacent the steering wheel; a center cover extending generally vertically below the steering wheel; an operation lever provided at a position laterally of the control panel; a valve unit with a pair of spools, the valve unit being located at a lower position with respect to the steering wheel and being covered by the center cover; a link mechanism that links the operation lever and the pair of spools, the link mechanism being covered by the center cover.

15 Claims, 17 Drawing Sheets

US 8,205,701 B2

OPERATING SYSTEM FOR TRACTOR

CROSS-REFERENCE TO RELATED APPLICATIONS

This application is a continuation of co-pending patent application Ser. No. 11/375,373 filed Mar. 14, 2006, which claims priority to Japanese Patent Application Nos. 2005-131527 and 2005-191604 filed Apr. 28, 2005 and Jun. 30, 2005, respectively, all of which are hereby incorporated by reference in their entireties.

BACKGROUND OF THE INVENTION

The present invention relates to operating systems for the front loader of a tractor.

An implement is often connected to a tractor. When a front loader is connected to a front portion of a tractor as one such accessory implement, then, as shown in JP H4-110406U, for example, the left and right support beams of the front loader are connected via brackets to mounting seats that are provided to the left and right below the front portion of the driving portion, and to one of the brackets are attached valves for raising and lowering the boom and for rotating the bucket and an operation lever for operating these.

The job of the front loader is to raise and lower the boom and rotate the bucket while repeatedly moving back and forth in the longitudinal direction of the tractor, and thus it is desirable for the loader operation lever to be furnished at a high position next to the steering wheel, and to this end, frames are provided specifically to support the operation lever at a high position, resulting in a configuration in which the loader operation structure is large and has many structural components.

SUMMARY OF THE INVENTION

It is an object of the invention to provide an operating system that has an operation lever for a front loader that can be operated with ease while operating the steering wheel. A further aim of the invention is to provide an operating system that can provide a more comfortable space for the operator because the essential components of the operating system are furnished in the center frame.

An operating system in accordance with the present invention for a tractor to which an implement is attachable, the operating system comprises: a steering wheel provided rearwardly of a hood that houses an engine located in a forward region of the tractor; a control panel provided rearwardly of the hood and adjacent the steering wheel; a center cover extending generally vertically below the steering wheel; an operation lever provided at a position laterally of the control panel; a valve unit with a pair of spools, the valve unit being located at a lower position with respect to the steering wheel and being covered by the center cover; a link mechanism that links the operation lever and the pair of spools, the link mechanism being covered by the center cover.

DETAILED DESCRIPTION OF THE PREFERRED EMBODIMENTS

Figure 1:
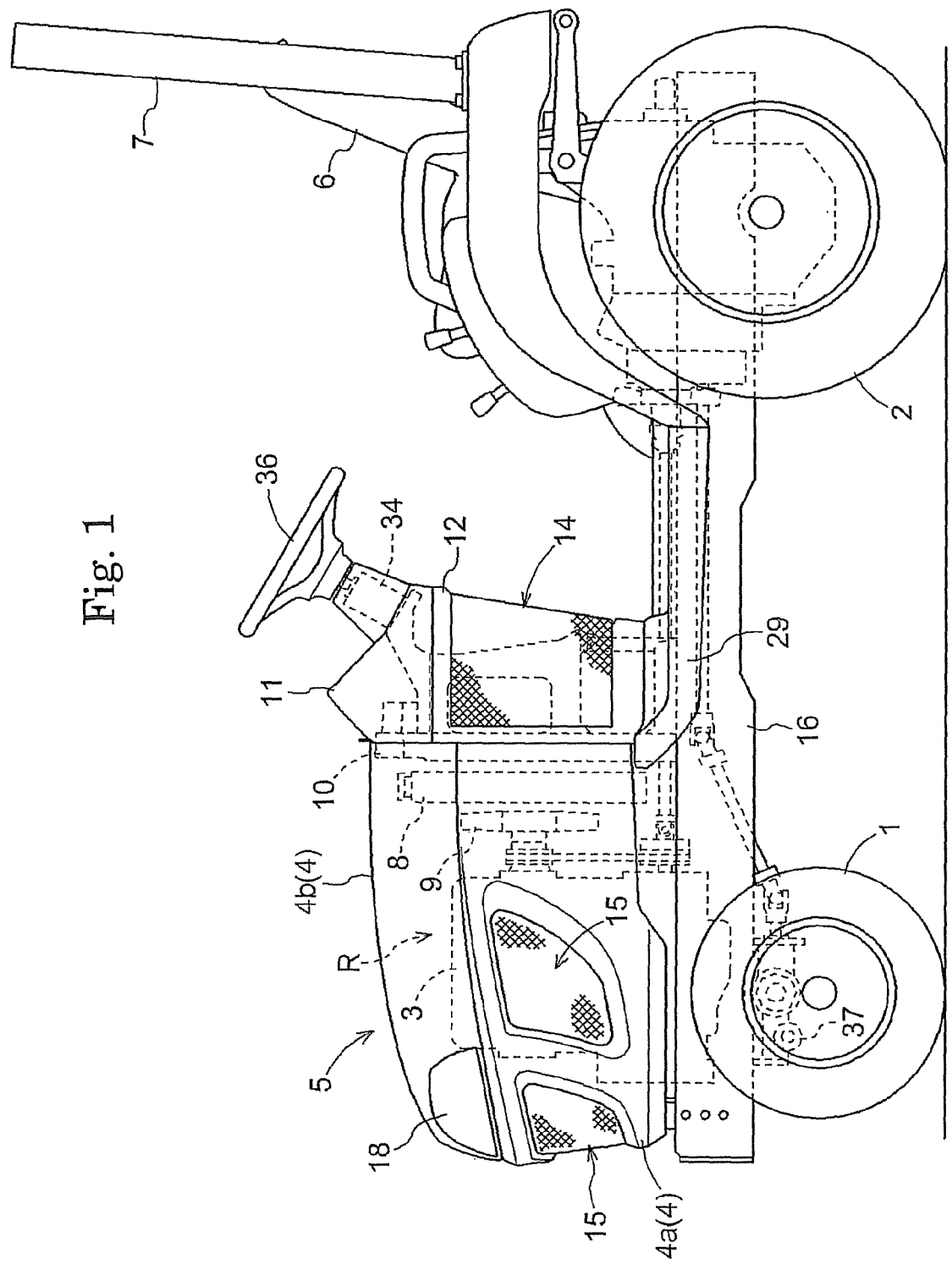
FIG. 1 is an overall lateral view of the tractor.
Figure 2:
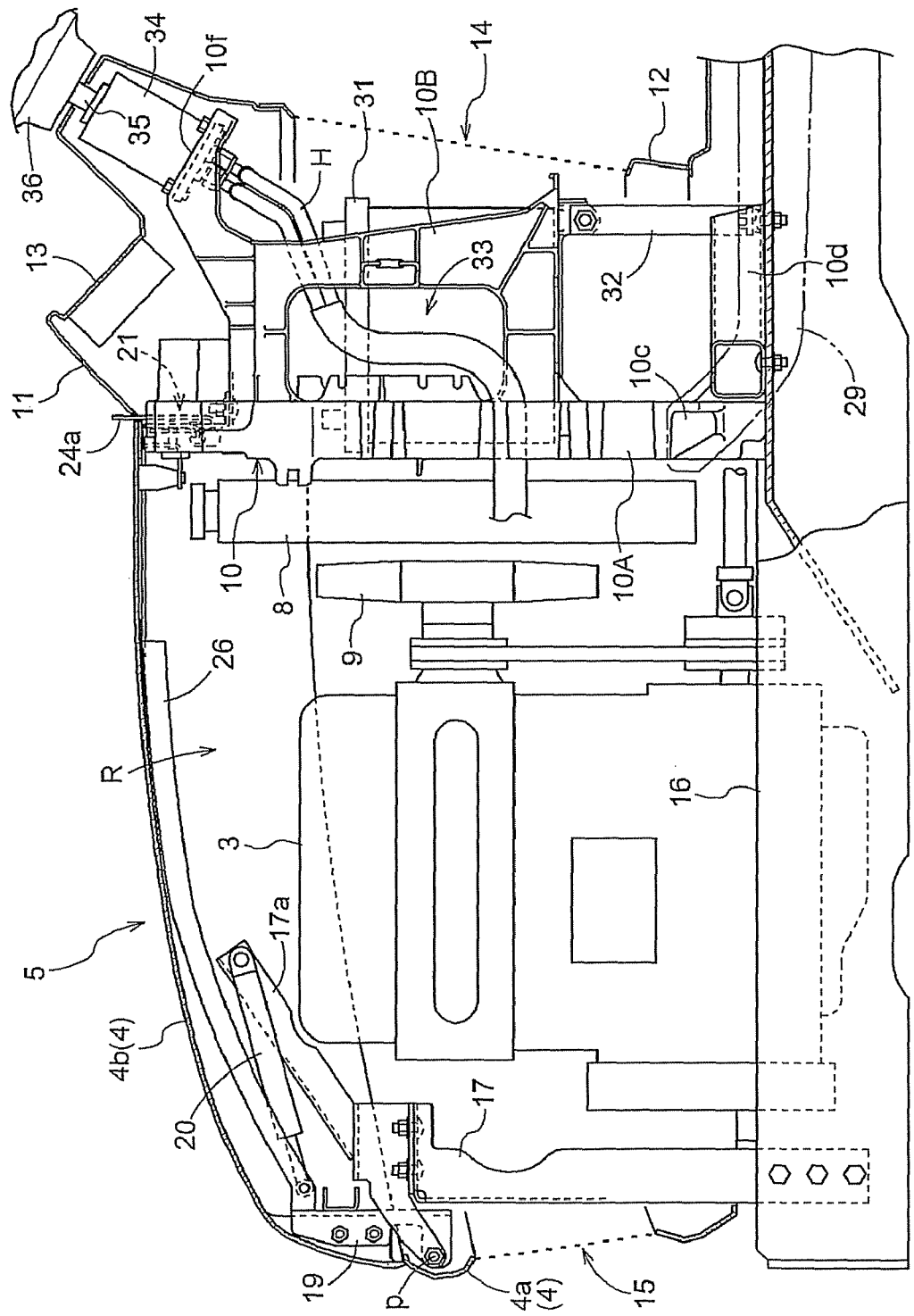
FIG. 2 is a lateral view of the engine portion.

FIG. 1 shows a tractor having an engine portion structure according to the invention. This four-wheel drive tractor is driven by front wheels 1 and rear wheels 2, on the front side of the tractor is provided an engine portion 5 made of an engine 3 that is covered by an engine hood 4, a driver's seat 6 is disposed between the left and right rear wheels 2, and behind the driver's seat 6 is provided a rollover protection frame 7 with a top horizontal bar and a pair of vertical support columns.

The engine hood 4 is made of a stationary lower hood 4a and an upper hood 4b that can be slid open and closed vertically about a fulcrum p at a front-portion thereof, and the engine 3 and the various machine components that are associated with the engine 3 are accommodated in the engine compartment R that is formed by the engine hood 4 and disposed in front of a radiator 8.

A frame structure 10 serving as the rear wall of the engine portion 5 is provided vertically at the rear portion of the engine compartment R, and to the frame structure 10 are mounted a panel cover 11 and a center cover 12 below the panel cover 11.

An instrument panel 13 and various switches are installed in the panel cover 11, and a ventilation opening 14 whose structure blocks out dust is formed in the center cover 12. The outside air that has been introduced through the ventilation opening 14 is sucked in by a radiator fan 9 and guided to the radiator 8, after which the air flows forward in the engine compartment R, discharging heat within the room to the outside through ventilation openings 15 in the front face and lateral fore portions of the engine hood 4.

The lower hood 4a making up the lower portion of the engine hood 4 is formed in the shape of a flat bracket that is open to the rear and is fixedly joined to a vehicle frame 16, and the ventilation openings 15 are formed in a meshed pattern in the forward face and the lateral faces of the lower hood 4a.

The upper hood 4b is pivotably connected to an upper end portion of a fixed support frame 17, which extends vertically from the vehicle frame 16, in such a manner that it can swing about the fulcrum p, and a pair of left and right front lights 18 are attached to the front end portion of the upper hood 4b. A gas spring 20 is engaged between the lateral center region of a fulcrum fitting 19 that is attached to the inner surface of the fore end portion of the upper hood 4b and a stay 17a that extends from the lateral center region of the fixed support frame 17, and as shown in FIG. 3, the extension bias properties of the gas spring 20 are set in accord with the weight of the upper hood 4b so that the extension bias of the gas spring 20 safely holds the upper hood 4b at a open position that allows maintenance tasks to be performed.

The upper hood 4b is also designed so that it is held in a closed orientation by an interlocking lock mechanism 21 that is disposed on its free-end side. That is, as shown in FIG. 3, an interlocking pin 22 is fastened to a center region of the rear free end portion of the upper hood 4b via a support fitting 23, and a hook-shaped lock fitting 24 that engages the interlocking pin 22 is pivotably attached to the upper end portion of the frame structure 10 in such a manner that it can horizontally rotate about a fulcrum a. The lock fitting 24 is rotatively biased in the engaging lock direction by a spring 25, and as shown in FIG. 11(I), the interlocking pin 22 of the upper hood 4b, which is closed in resistance to the gas spring 20, engages the lock fitting 24 and holds the upper hood 4b in the closed position.

Figure 11A:
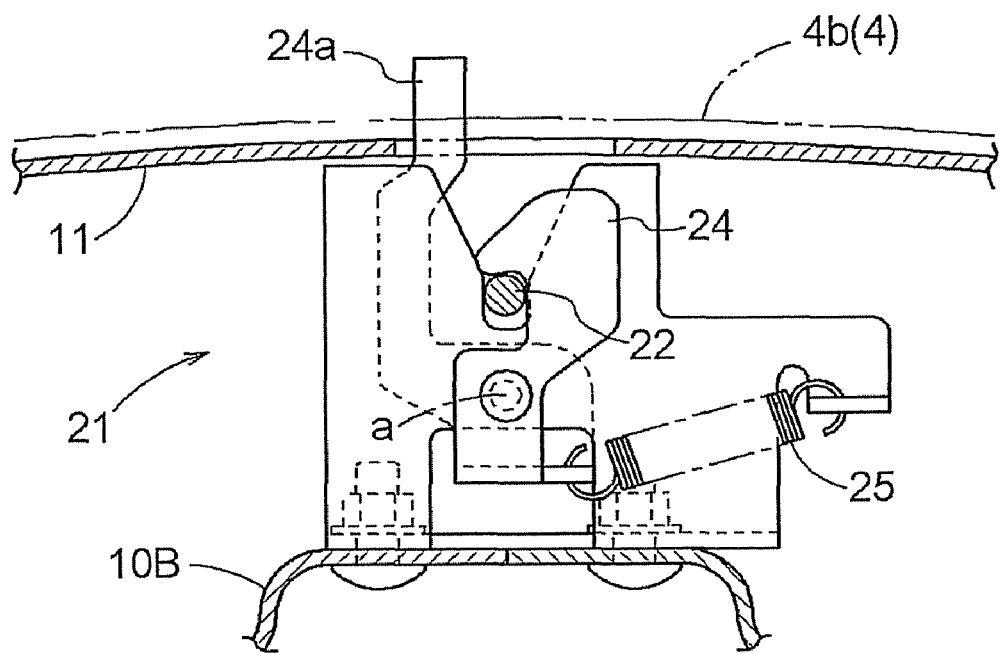
FIG. 11 is a front view of the interlocking lock mechanism.
Figure 11B:
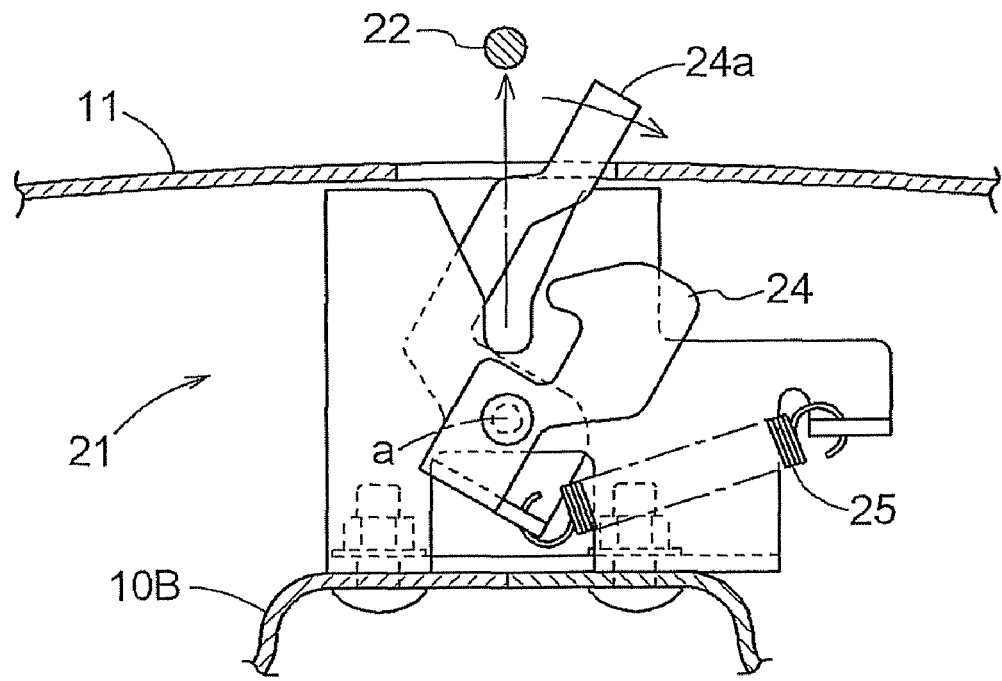

An operation lever 24a is joined to the lock fitting 24 and extends above the panel cover 11, and as shown in FIG. 11(II), horizontally swinging the operation lever 24a to rotate the lock fitting 24 in resistance to the spring 25 has the effect of slightly lifting the upper hood 4b, whose lock has been released, due to the bias applied by the gas spring 20, and simply by putting one's fingers there and pivoting this open with a wide swinging action, the upper hood 4b can be held in the open position by the gas spring 20.

Figure 3:
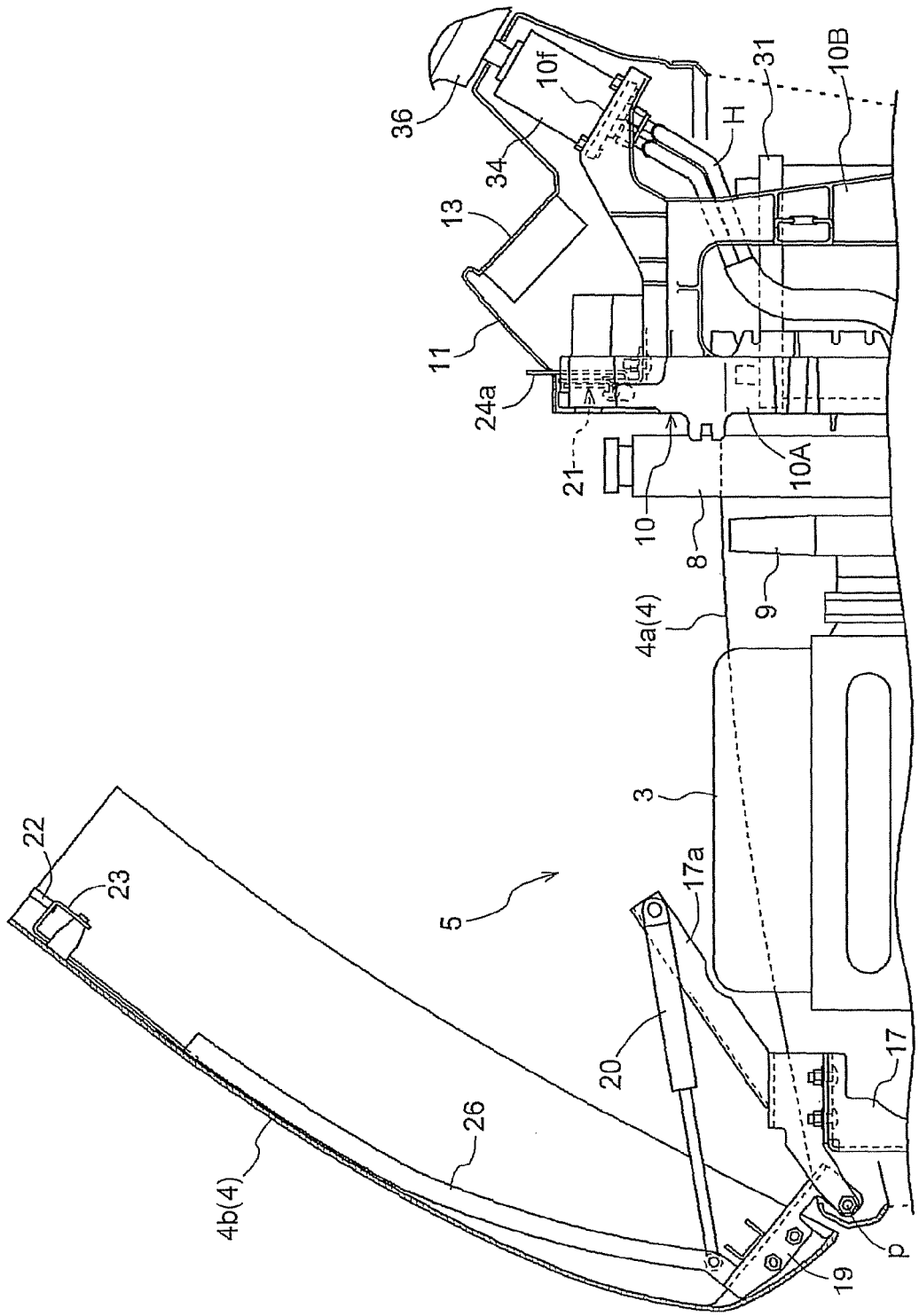
FIG. 3 is a lateral view of the engine hood in the open state.
Figure 4:
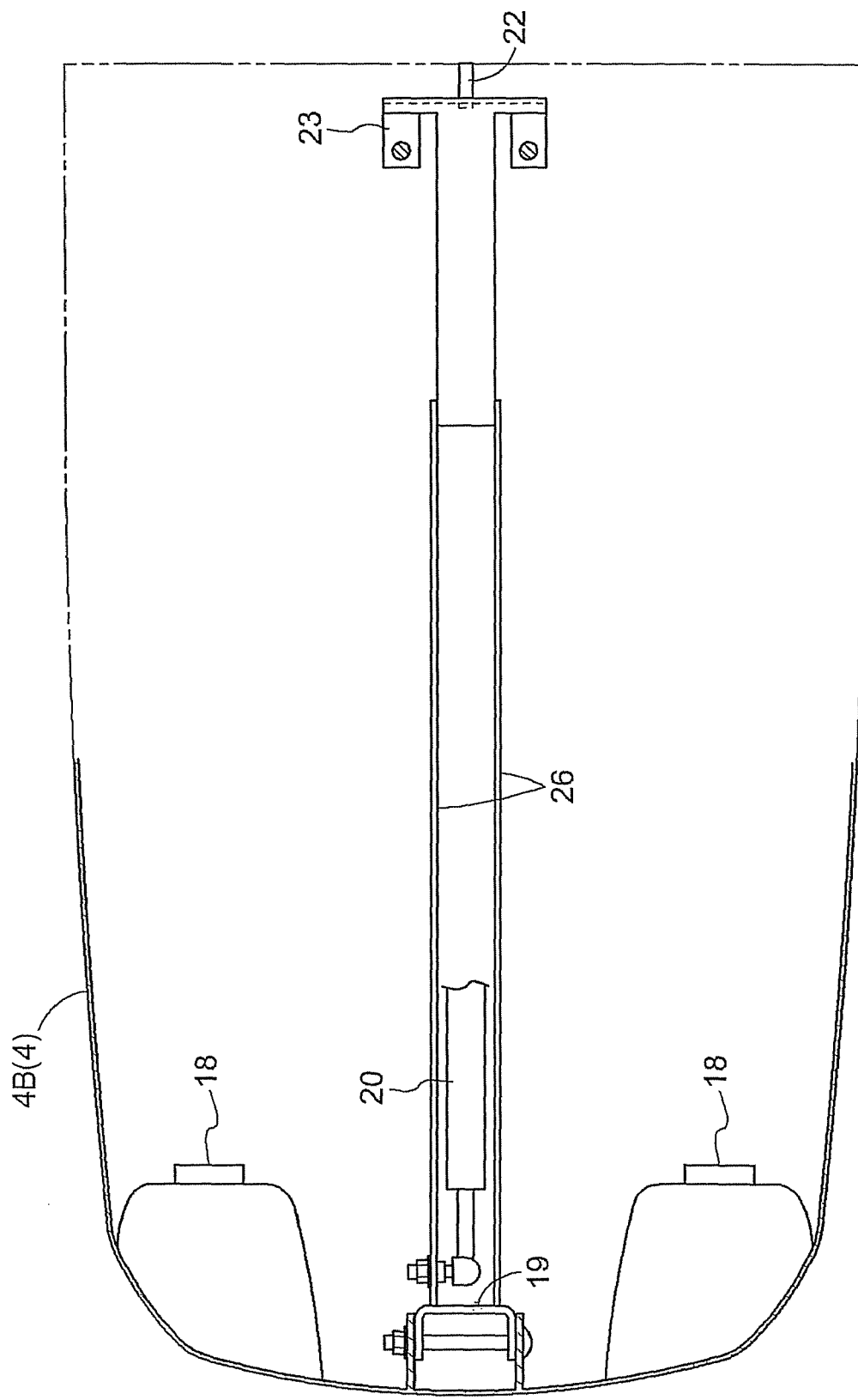
FIG. 4 is a plan view showing a portion of the engine hood.
Figure 5:
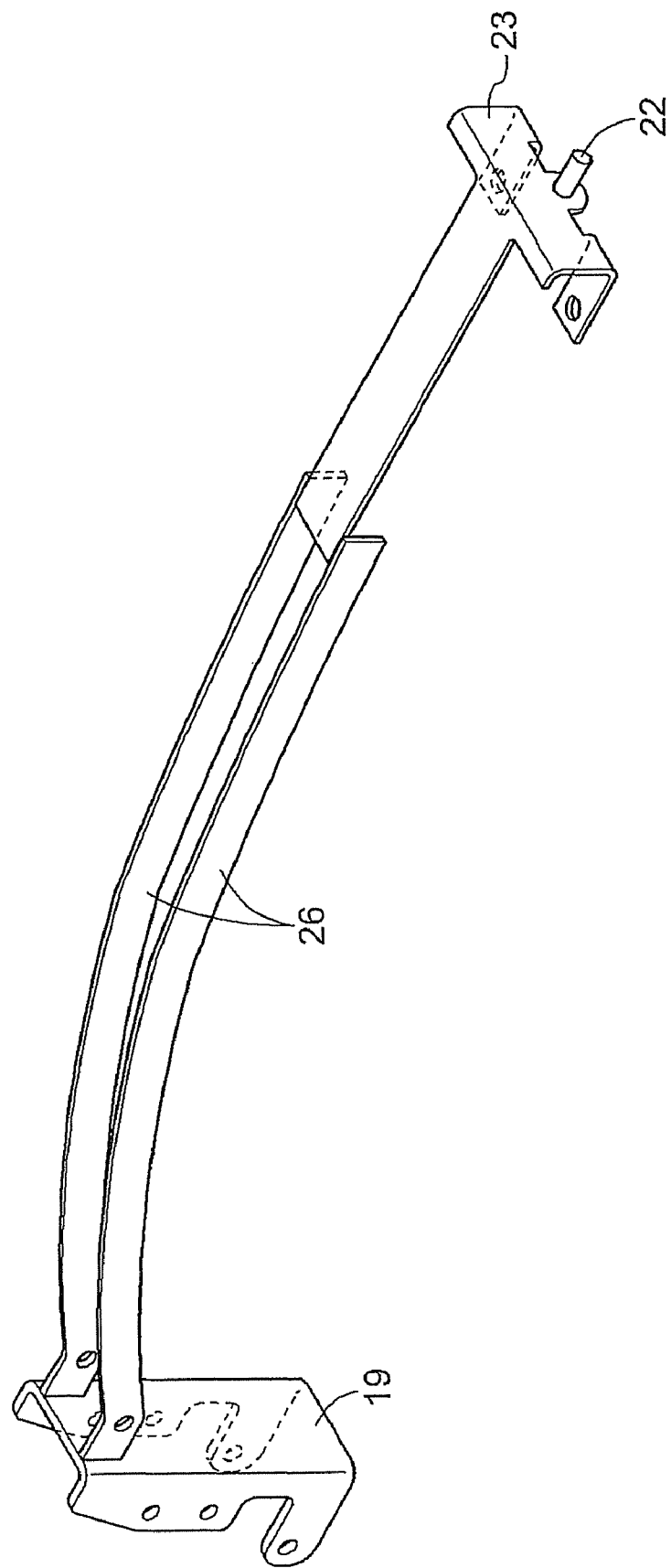
FIG. 5 is a perspective view showing a stay for reinforcing the hood.

It should be noted that, as shown in FIGS. 3 to 5, a stay 26 that is long in its lengthwise direction and that spans between the fulcrum fitting 19, to which the gas spring 20 is connected, and the support fitting 23 of the interlocking pin 22, is furnished in a vertical orientation along the inner surface of the roof of the upper hood 4b, and reinforces the upper hood 4b, which is a resin mold. Thus, the upper hood 4b is kept from bending under the upward bias force applied by the gas spring 20 when its rear end is fixed in the interlocked state.

Figure 8:
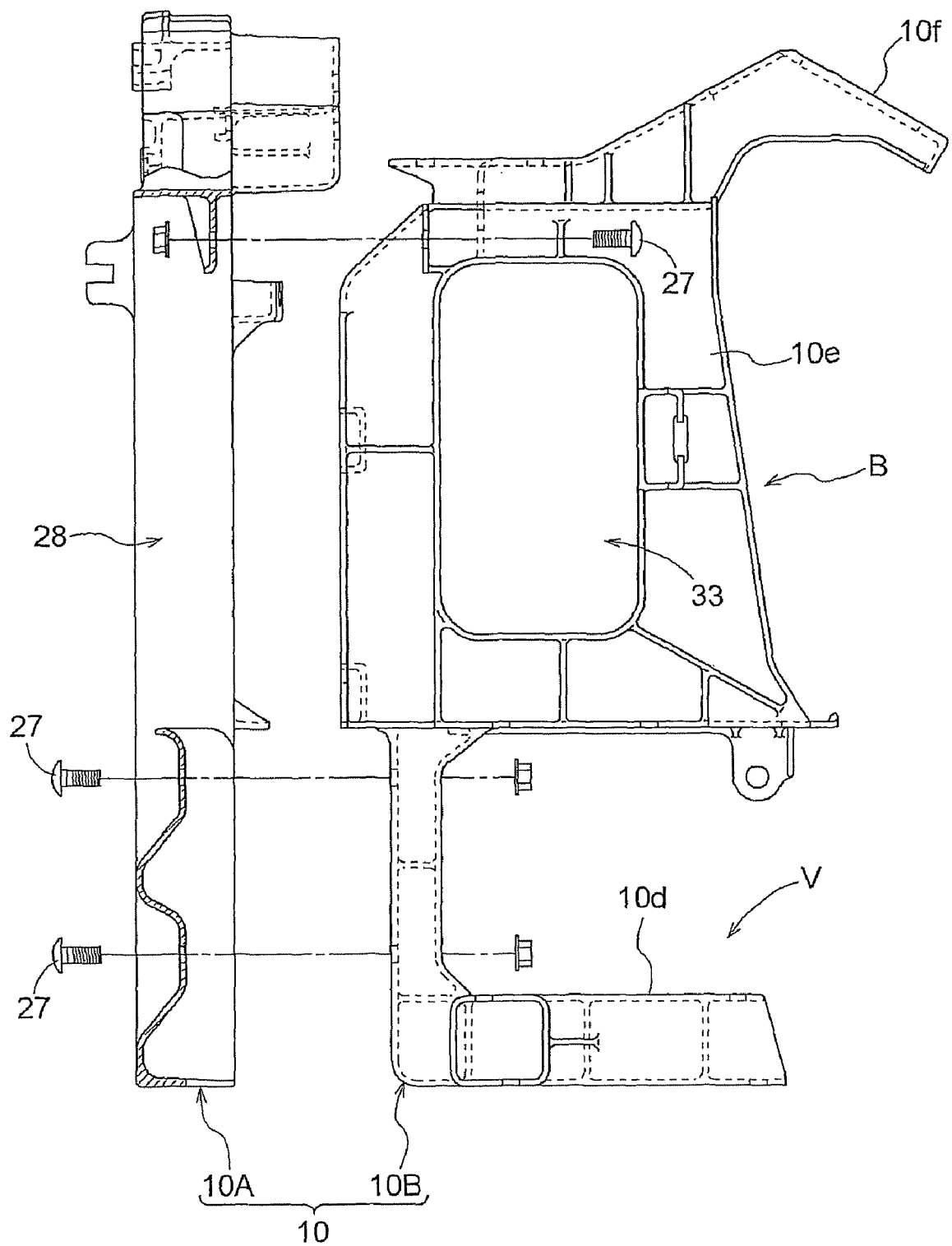
FIG. 8 is an exploded lateral view of the frame structure.
Figure 9:
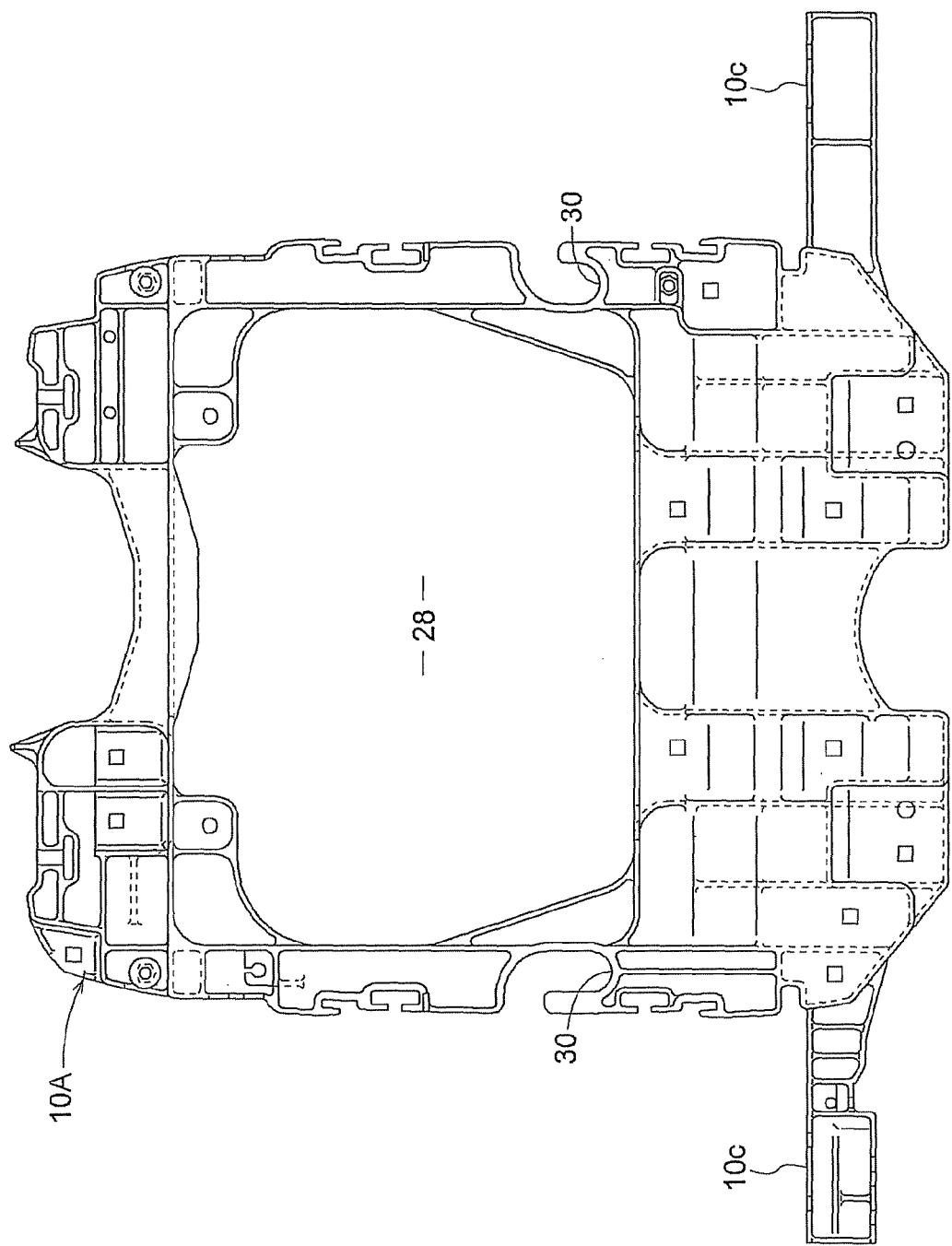
FIG. 9 is a front view showing the partition portion of the frame structure.

As shown in FIG. 8, the frame structure 10, which serves as the rear wall of the engine portion 5, is made by joining a partitioning portion 10A that is aluminum cast and horizontally wide and flat in the lengthwise direction, and a support frame portion 10B that is aluminum cast as well and divided into left and right portions, and the portions 10A and 10B are joined by six threaded bolts 27 that position the two at appropriate locations in the lengthwise direction.

Figure 6:
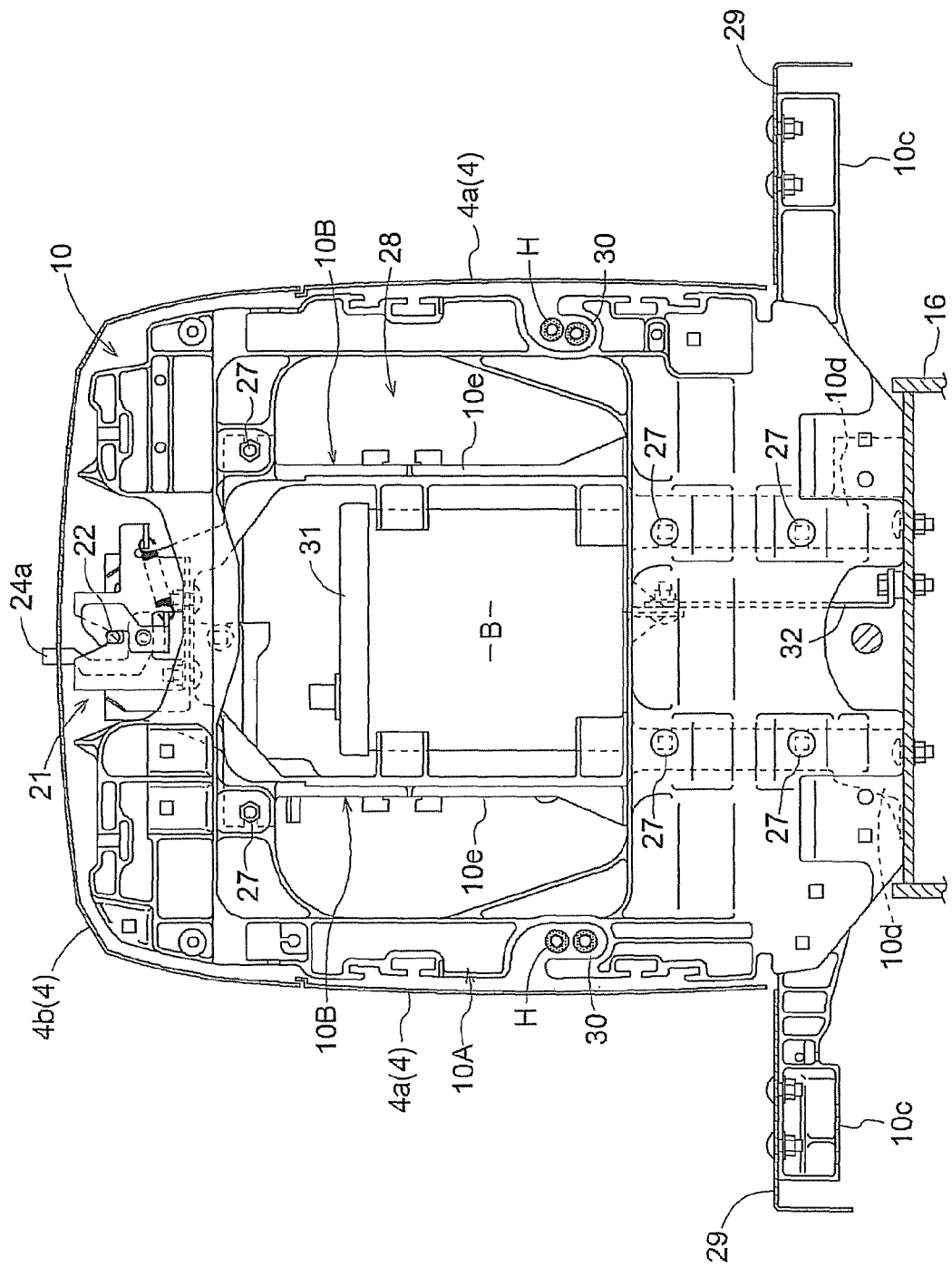
FIG. 6 is a front view of the frame structure.
Figure 7:
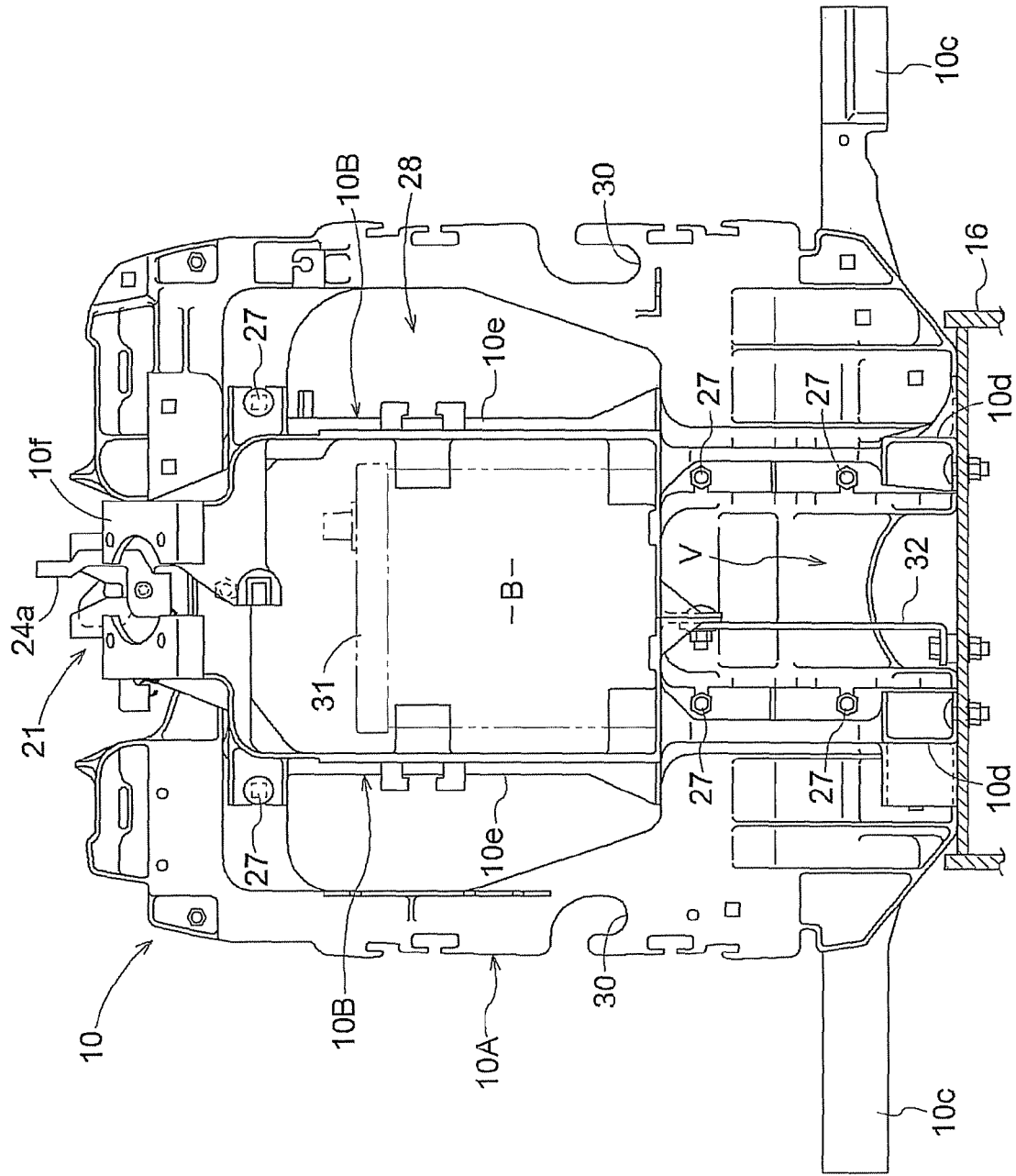
FIG. 7 is a rear view of the frame structure.

As shown in FIG. 6, the partitioning portion 10A of the frame structure 10 is formed at the same width as the lateral width of the rear end portion of the engine portion 5, and the rear end of the engine hood 4 and the front end of the center cover 12 are disposed along the outer circumference of the partitioning portion 10A. The air intake portion of the radiator 8 is furnished in a large opening 28 that is formed in a central portion of the partitioning portion 10A, and the outside air that is taken in through the ventilation opening 14 of the center cover 12 is guided to the radiator 8 by way of the frame structure 10. A step support portion 10c is provided projecting horizontally outward from the left and right lower end portions of the partitioning portion 10A, and the left and right front of a step 29 that is disposed in the feet area of the driver's seat 6 rests on and is fastened to the step support portion 10c. A recessed portion 30 that is bent downward in the shape of a hook is formed in the left and right outer circumference portions of the partitioning portion 10A, and wiring and hydraulic hoses H are inserted into the recessed portion 30 from the side and are safely held on the bottom side of the recessed portion 30.

Figure 10:
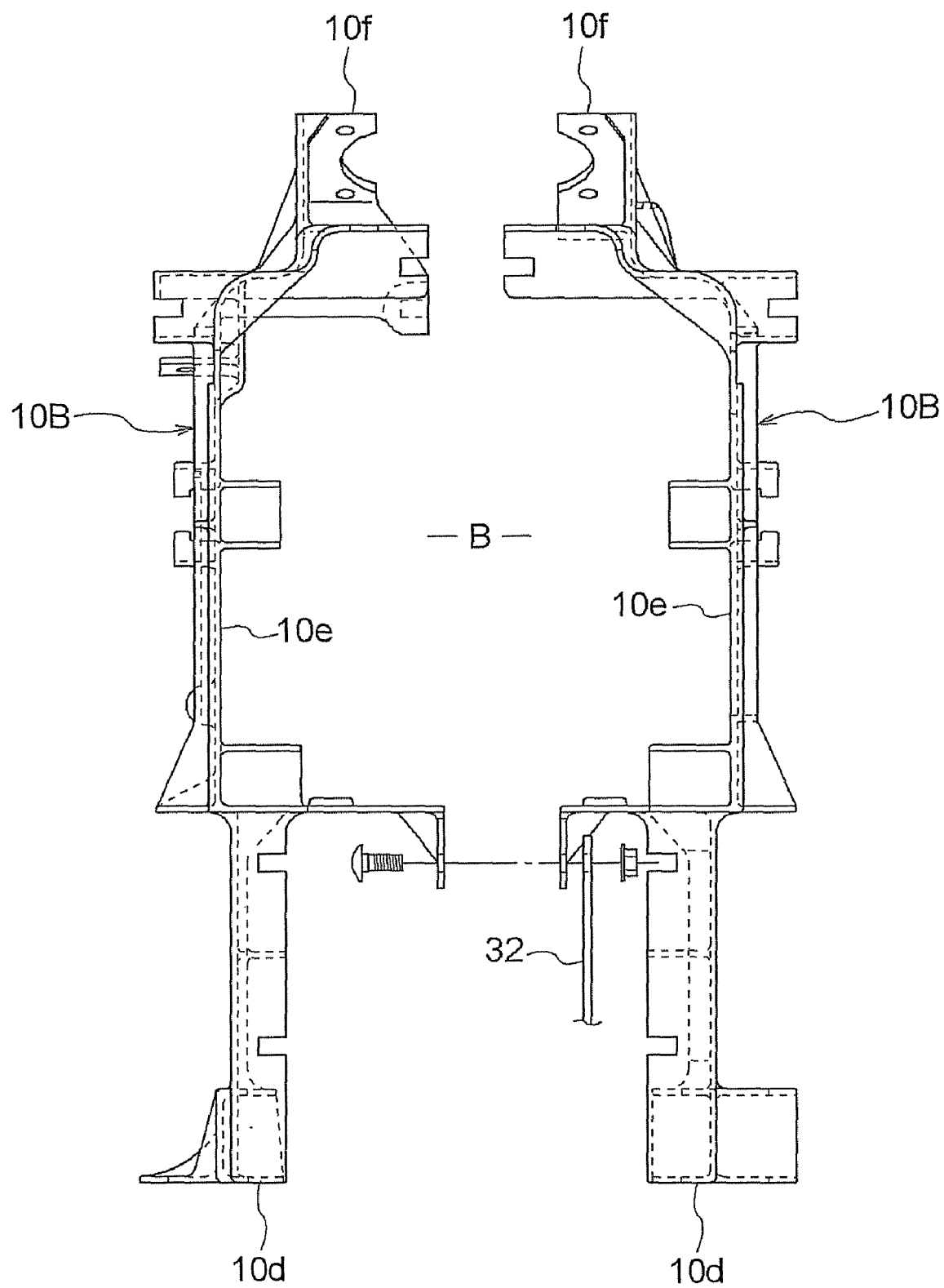
FIG. 10 is a front view showing the support frame portion of the frame structure.

As shown in FIG. 10, the left and right support frame portions 10B of the frame structure 10 are joined by bolts, and at their lower end portions are furnished with a pair of left and right leg portions 10d. The leg portions 10d extend wide to the rear and rest on and are bolted to the vehicle frame 16, and this allows the entire frame structure 10 to be safely fastened upright.

A box-shaped portion 10e that is open in the lengthwise direction is provided in the upper half of the support frame portion 10B, and forms a battery support portion B. The battery support portion B is formed projecting rearward, a predetermined distance upward away from the leg portions 10d, such that a battery 31 can be inserted into the inner space of the battery support portion B, which is formed in the shape of a box, from the rear and fixedly attached. It should be noted that the rear end of the box-shaped portion 10e and the vehicle frame 16 are connected by a stay 32 and serve as reinforcement for the battery support portion B, which receives the weight of the battery. Openings 33 are formed in the left and right lateral faces of the box-shaped portion 10e, and these improve air circulation within the battery containment space and make the battery support portion B more lightweight.

A mounting seat 10f extends rearward and upward on an upper portion of the battery support portion B, which is formed in a box shape, and by connecting this to a hydraulic controller 34 for power steering, the left and right partitions of the support frame member 10B are joined at an upper portion as well. An operation shaft 35 to which a steering handle 36 is attached extends upward from the hydraulic controller 34. The hydraulic controller 34 delivers an amount of pressurized oil that corresponds to the amount that the steering handle 36 has been rotatively actuated, in a direction that corresponds to the direction in which the handle has been actuated, supplying it to hydraulic cylinders 37 for front wheel steering via the hydraulic hoses H.

Figure 14:
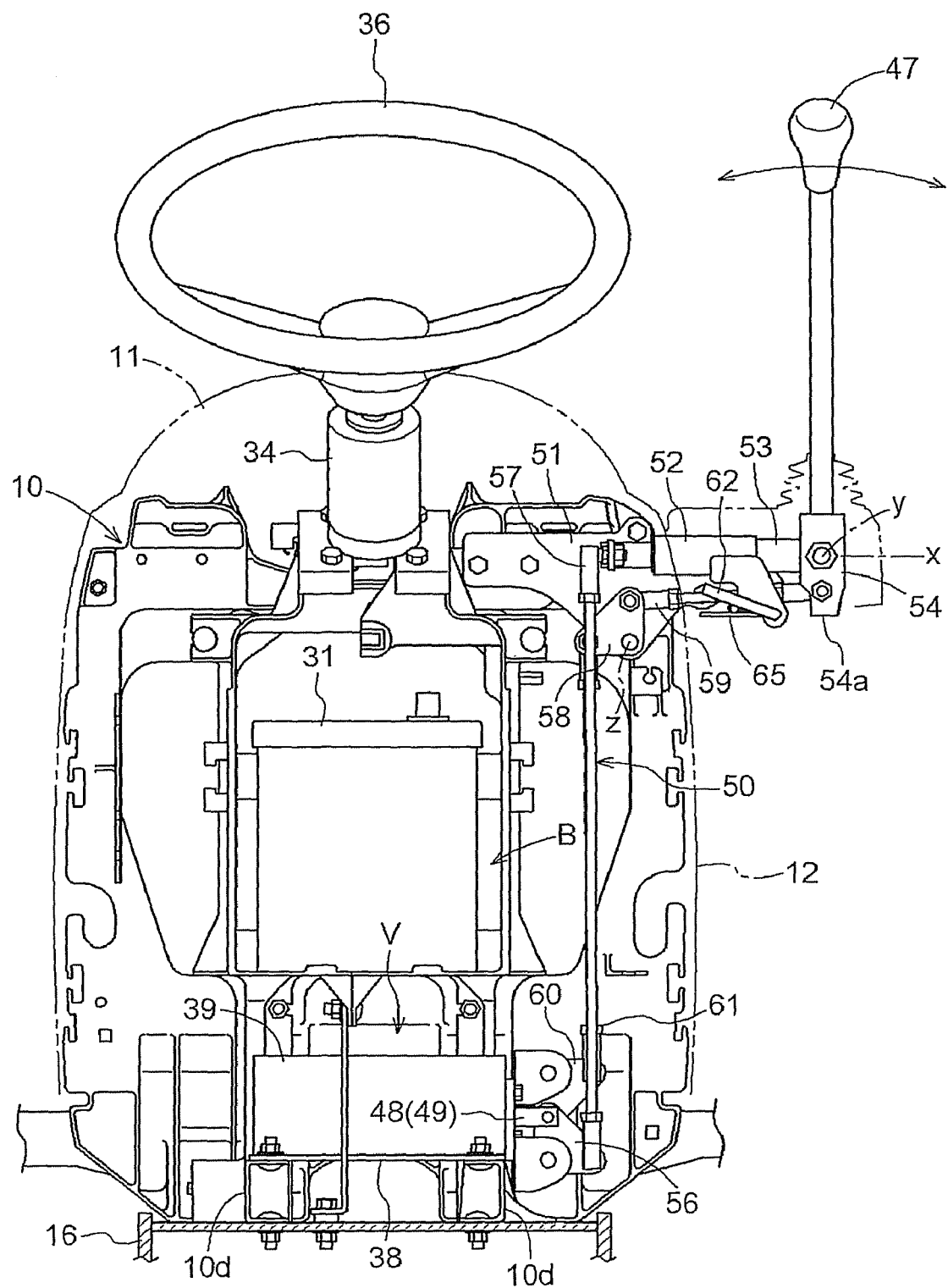
FIG. 14 is a front view of the steering portion.

The leg portions 10d also function as valve support portions V, and as shown in FIG. 14, this allows a support plate 38 to be attached to the upper surface of the left and the right leg portions 10d, and a valve 39 (valve unit) can be attached onto the support plate 38.

Figure 12:
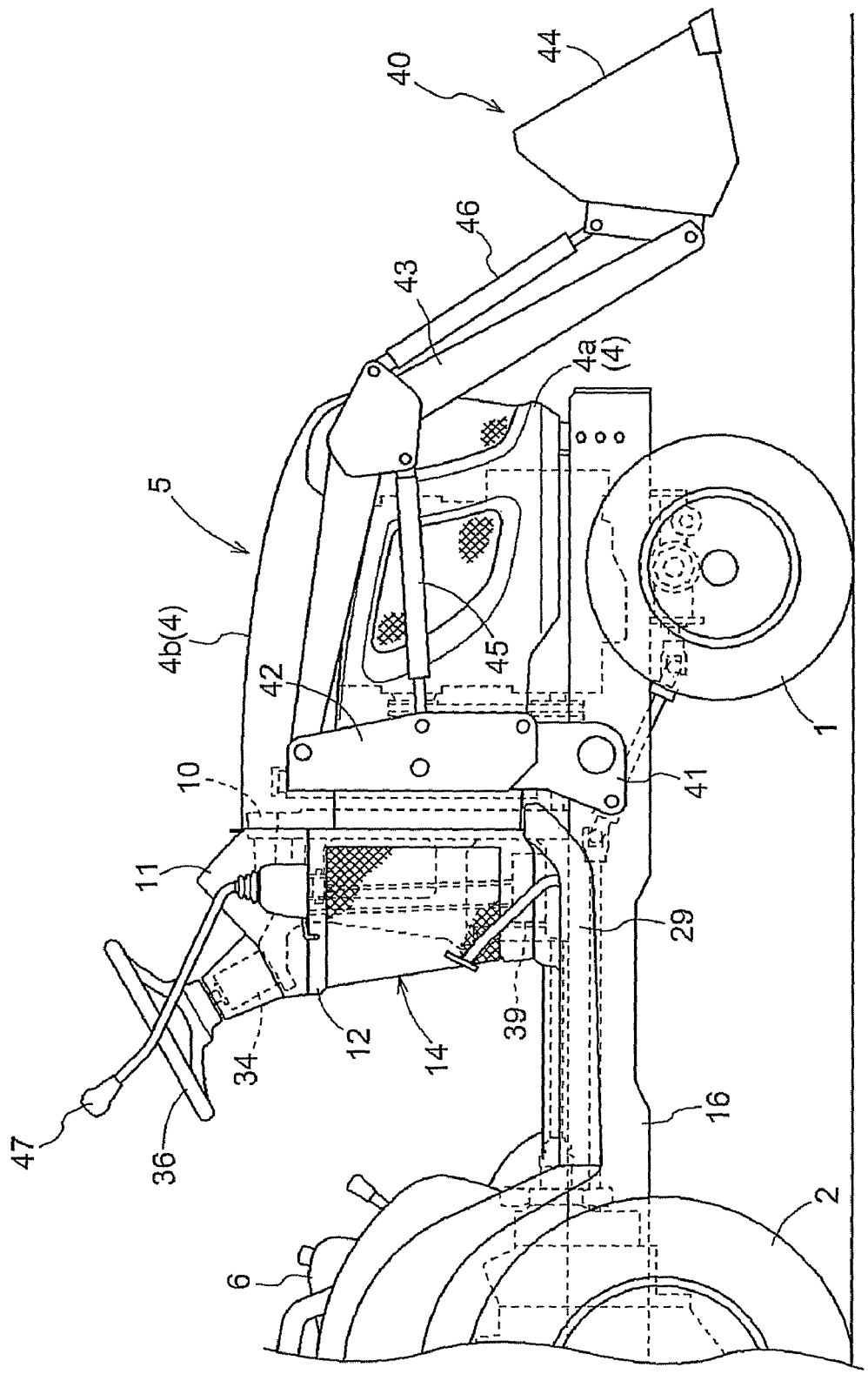
FIG. 12 is a lateral surface view of the tractor front to which a front loader has been mounted.
Figure 13:
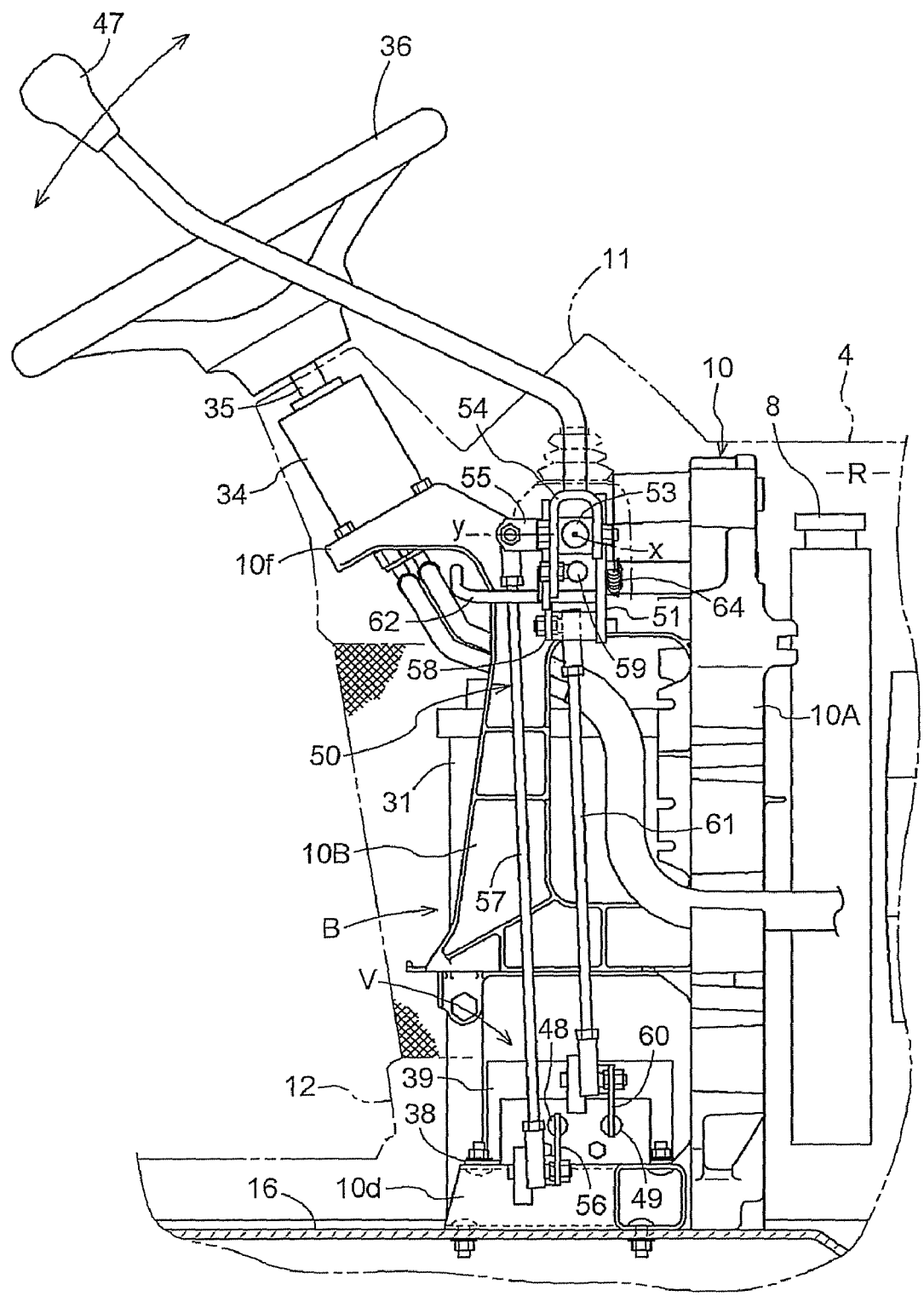
FIG. 13 is a lateral view of the steering portion.

The valve 39 is for driving hydraulic drive-type accessory implements, and FIGS. 12 to 14 show a tractor, and the steering portion thereof, in which a front loader 40, which is one example of an accessory implement, has been connected to the front of the vehicle.

The front loader 40 is made of a pair of left and right support frames 42 that are fixedly joined in a detachable manner to support brackets 41, which are provided at the left and the right of the front portion of the tractor machine 1, a pair of left and right booms 43 that are connected to the upper end portion of the support frames 42 in such a manner that they can be swung vertically, and a bucket 44 that is connected to the left and right booms 43 over their front ends in such a manner that it can rotate vertically, and the booms 43 are lifted up and down by a lift cylinder 45 and the bucket 44 is rotatively driven by a tilt cylinder 46.

An operation lever 47 for operating the valve 39 is disposed on the upper right side of the frame structure 10, and the connecting structure for linking the valve 39 and the operation lever 47 is described below.

The valve 39 is furnished with two spools 48 and 49 that can slide laterally and that project to the right of the machine, where the one spool 48 can be slid between three positions to select extension, retraction, or an intermediate stationary state of the lift cylinder 45, and the other spool 49 can be slid between three positions to select extension, retraction, or an intermediate stationary state of the tilt cylinder 46.

Figure 15:
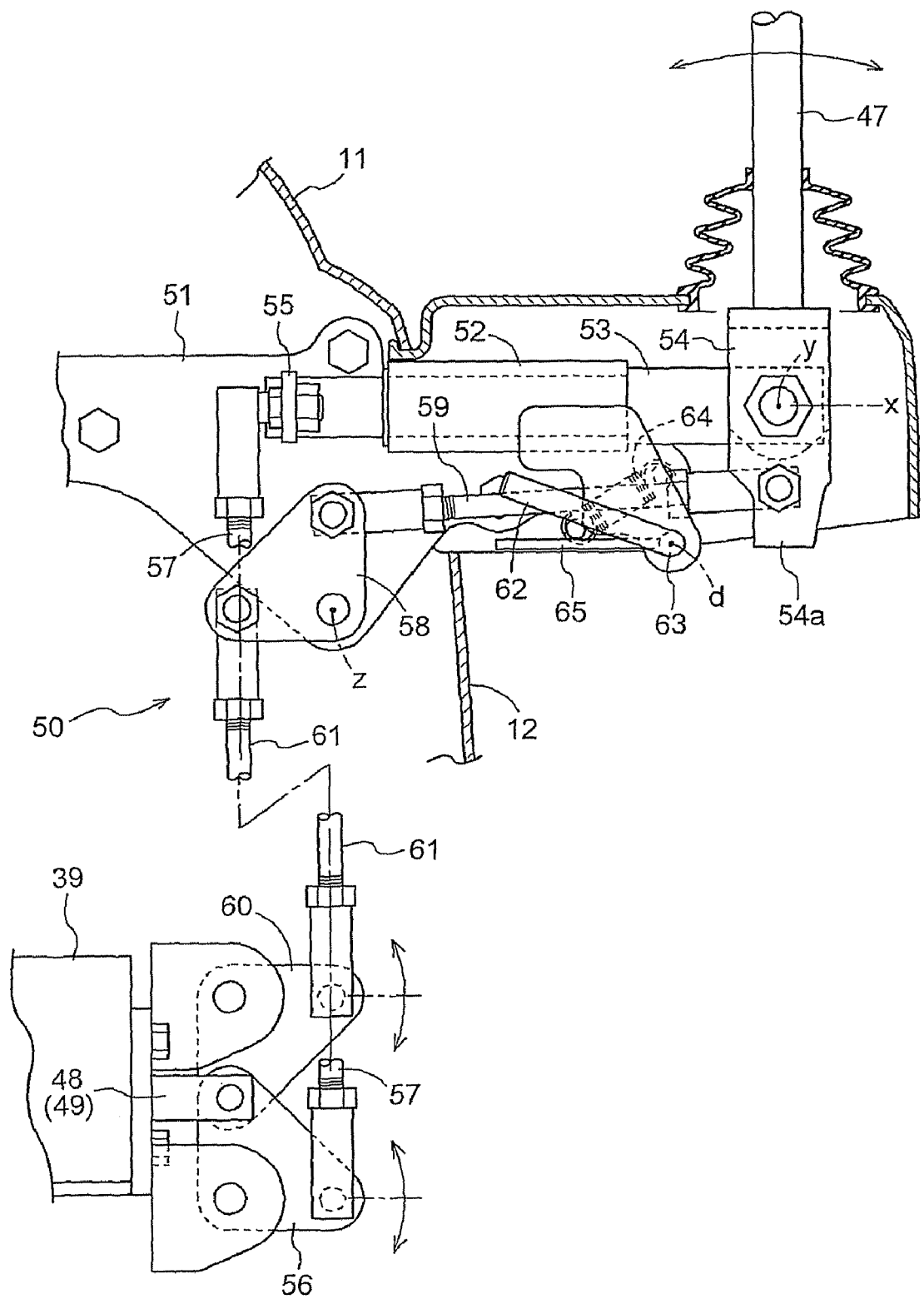
FIG. 15 is a rear view of the front loader operation portion.

The operation lever 47 and the two spools 48 and 49 are operatively connected by a link mechanism 50, and their structures are shown in detail in FIGS. 14 and 15.

A support bracket 51 is bolted to an area on the right side of the upper portion of the frame structure 10, and a lever spindle 53 is fitted into and supported by a lateral boss portion 52, which is provided in the support bracket 51, in such a manner that it can rotate about a lateral axis x. The operation lever 47 is linked to a rotating fitting 54 that is connected by pins to the outer end portion of the lever spindle 53 in such a manner that it can rotate to the left and right about a longitudinal axis y that is at a right angle to the lateral axis x, and thus the operation lever 47 is supported in such a manner that it can swing in a cross about the two perpendicular axes x and y.

An operation arm 55 is integrally connected to the inner end portion of the lever spindle 53, and the operation arm 55 and a bell crank 56 that is operatively connected to an end portion of the spool 48 for the lift cylinder are operatively connected via a push-pull rod 57 that is long in the vertical direction. The rotating fitting 54 connected to the operation lever 47 and a relay bell crank 58 that is pivotably linked to the support bracket 51 in such a manner that it can rotate about a fulcrum z in the longitudinal direction are operatively connected to one another by way of a rod 59, and a bell crank 60 that is operatively connected to the spool 49 for the tilt cylinder and the relay bell crank 58 are operatively connected to a push-pull rod 61 that is long in the vertical direction.

Operatively connecting the operation lever 47, which can be actuated in a cross shape as above, and the two spools 48 and 49 via the link mechanism 50 allows the lift cylinder 45 to be actuated by swinging the operation lever 47 in the longitudinal direction and allows the tilt cylinder 46 to be actuated by swinging the operation lever 47 in the lateral direction.

The relay bell crank 58, the push-pull rods 57 and 61, and the valve 39 are covered and hidden by the center cover 12, and the outside air that is sucked in through the ventilation openings 14 of the center cover 12 and circulated toward the radiator 8 cools the valve 39 and the battery 32.

Figure 16:
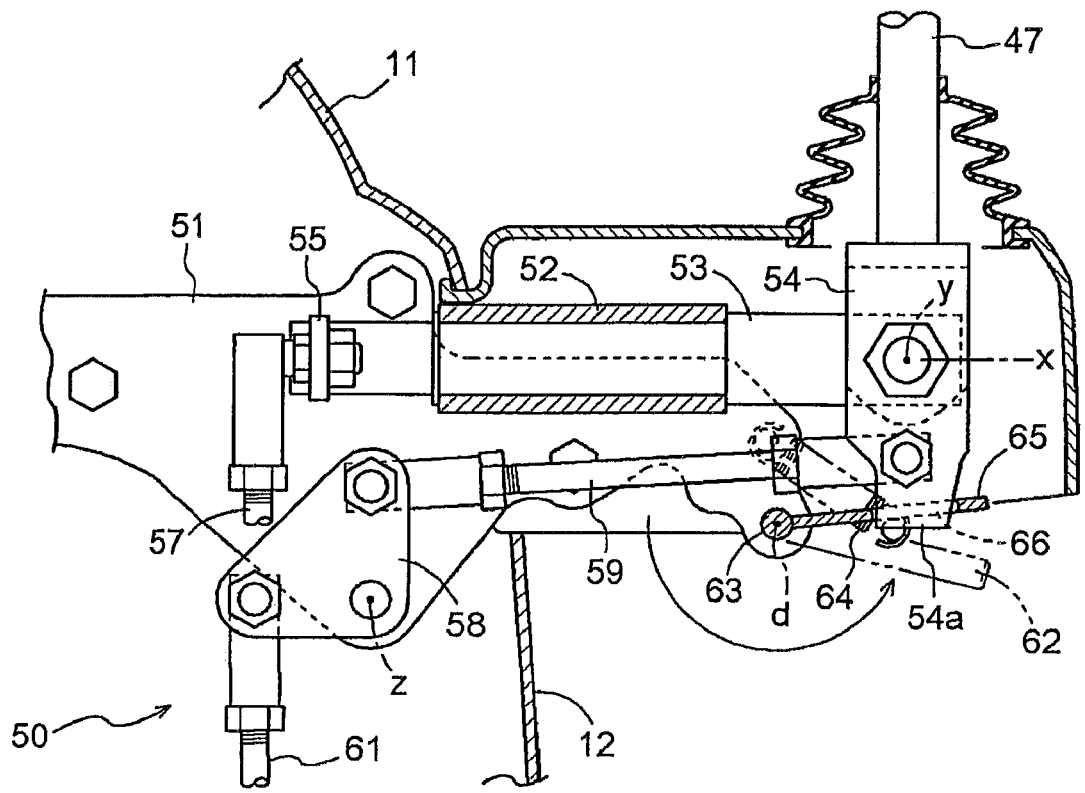
FIG. 16 is a rear view showing the lever lock state of the front loader operation portion.
Figure 17:
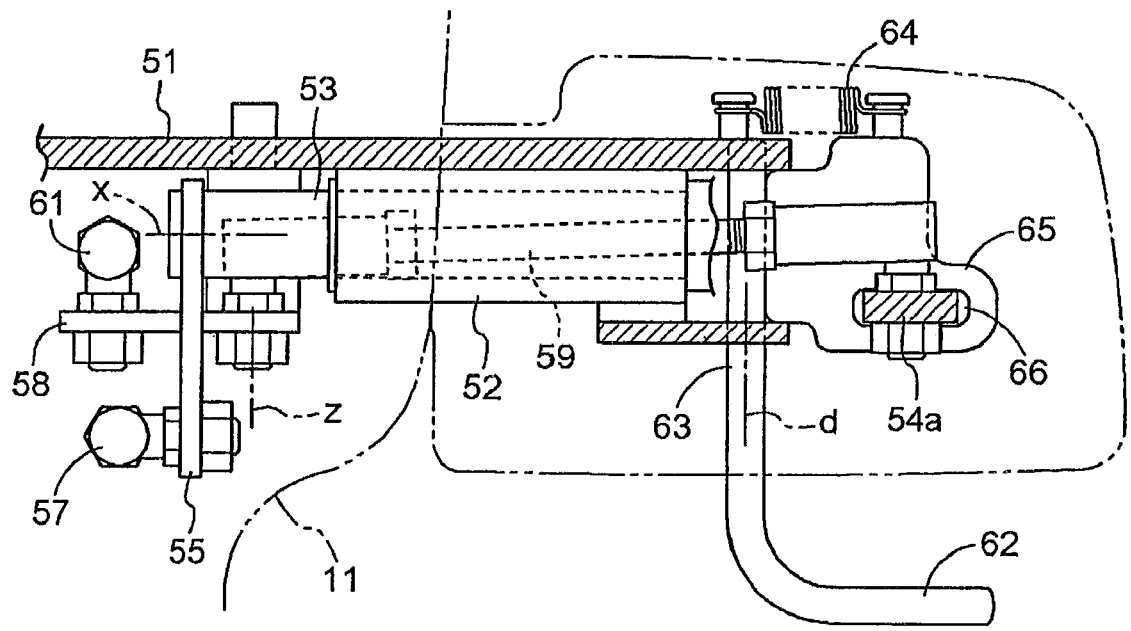
FIG. 17 is a plan view showing the lever lock state of the front loader operation portion.
Figure 18:
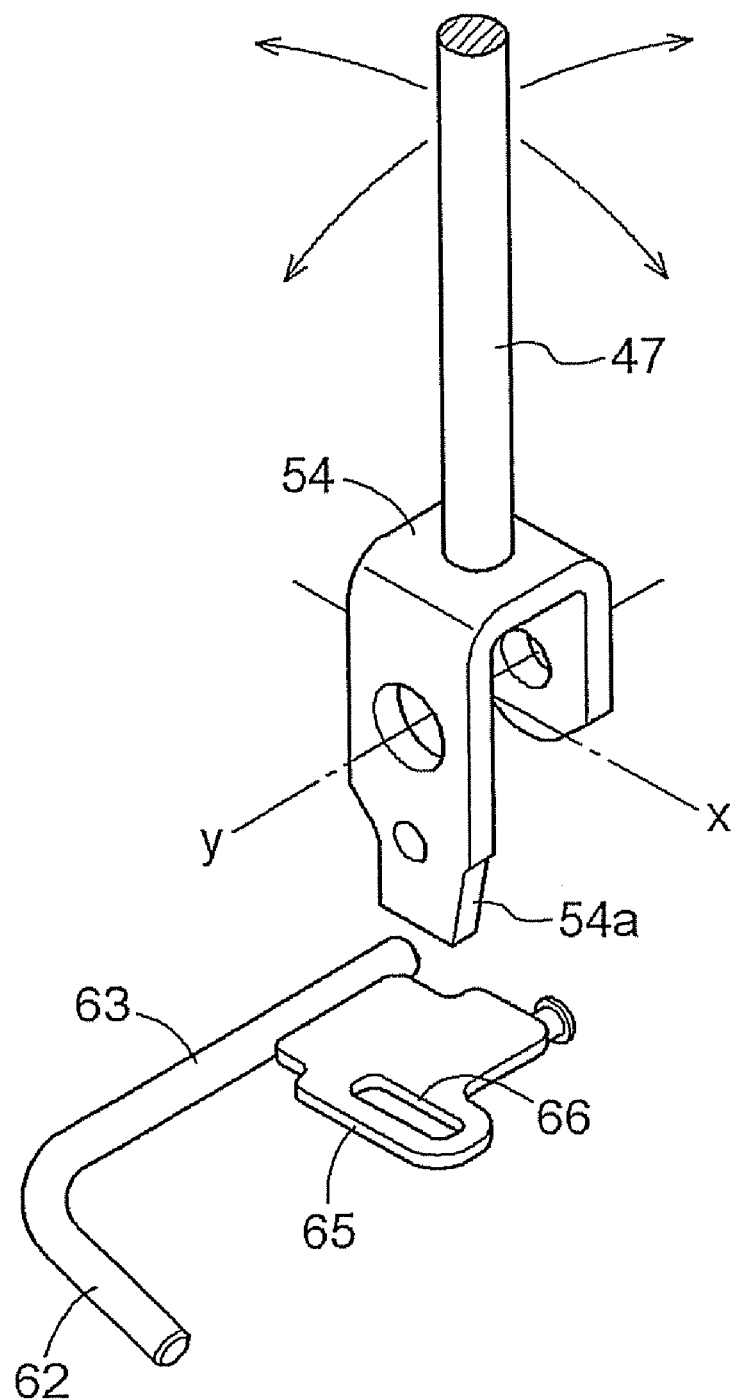
FIG. 18 is an exploded perspective view of the lever base portion.

The support bracket 51 is provided with a lock lever 62. The lock lever 62 is provided connected to a spindle 63 that is supported in such a manner that it can swing about a longitudinal axis d, and can be switched between and held in two separate states via a toggle spring 64. That is, as shown in FIG. 15, when the lock lever 62 is swingingly toggled to an orientation in which it faces the machine interior, a lock lip 65 that projects from the spindle 63 is moved from below the rotating fitting 54 to an away position in the machine interior, thereby allowing rotation of the rotating fitting 54 about the x and y axes. As shown in FIG. 16, when the lock lever 62 is toggled to an orientation in which it faces away from the machine, the lock lip 65 becomes positioned directly below the rotating fitting 54 and the interlocking portion 54a that projects downward from the rotating fitting 54 engages a lock hole 66 that is formed in the lock lip 65, and this prevents rotation of the rotating fitting 54 about the x and y axes and thereby keeps the operation lever 47 from being actuated inadvertently.

Other Embodiments (1) It is also possible to adopt a configuration in which the battery support portion B provided in the frame structure 10 is in the shape of a box that opens to the side, so that the battery 31 is inserted and removed from the side.

(2) In the foregoing embodiment, the leg portions 10d for connecting to the vehicle frame 16 were formed in the support frame portion 10B, but it is also possible to adopt a configuration in which the step support portion 10c and leg portions 10d functioning as valve support portions V are formed in a single unit with the partitioning portion 10A. Further, it is also possible to form the entire frame structure 10 through aluminum-pressure die-casting.

What is claimed is:

1. A tractor comprising:
    an engine supported at a forward position of a vehicle body;
    an engine compartment accommodating the engine;
    a driving region formed rearwardly of the engine compartment;
    a step forming a portion of a lower side of the driving region; and
    a frame structure disposed between the engine compartment and the driving region, the frame structure including:
        a partitioning portion partitioning between the engine compartment and the driving region and having an opening region in a central portion thereof;
        a support frame portion extending vertically across the opening region to reinforce the opening region of the partitioning portion; and
        a mounting seat for a steering wheel disposed upwardly of the opening region;
    wherein said frame structure forms a battery support portion, and a battery inserted in the battery support portion is accommodated with allowance in a space along the longitudinal direction of the vehicle body defined by a cross sectional area of said opening region.

2. The tractor as defined in claim 1, wherein a steering controller is mounted on said mounting seat.

3. The tractor as defined in claim 1, wherein said battery inserted in the battery support portion is overlapped at least partially in a side view with said partitioning portion.

4. The tractor as defined in claim 3, wherein said battery is disposed with positive and negative electrodes thereof being aligned with each other in the longitudinal direction of the vehicle body.

5. The tractor as defined in claim 1, wherein at lateral end regions of said partitioning portion, there is formed a recessed portion for allowing insertion therethrough of a hydraulic hose along the longitudinal direction.

6. A tractor comprising:
    an engine supported at a forward position of a vehicle body;
    an engine compartment accommodating the engine;
    a driving region formed rearwardly of the engine compartment;
    a step forming a portion of a lower side of the driving region;
    a frame structure disposed between the engine compartment and the driving region, the frame structure including:
        a partitioning portion partitioning between the engine compartment and the driving region and having an opening region in a central portion thereof;
        a support frame portion extending vertically across the opening region to reinforce the opening region of the partitioning portion; and
        a mounting seat for a steering wheel disposed upwardly of the opening region;
    a radiator disposed inside the engine compartment and rearwardly of the engine; and
    a radiator fan introducing outside air from said opening region through said radiator;
    wherein said frame structure forms a battery support portion, and the outside air introduced by said radiator fan flows through a circumference of a battery supported to said battery support portion.

7. The tractor as defined in claim 6, wherein said battery inserted in the battery support portion is accommodated with allowance in a space along the longitudinal direction of the vehicle body defined by a cross sectional area of said opening region.

8. The tractor as defined in claim 7, wherein a front end portion of said battery is overlapped in a side view with said partitioning portion.

9. The tractor as defined in claim 6, wherein a steering controller is mounted on said mounting seat.

10. The tractor as defined in claim 6, wherein at lateral end regions of said partitioning portion, there is formed a recessed portion for allowing insertion therethrough of a hydraulic hose along the longitudinal direction.

11. A tractor comprising:
    an engine supported at a forward position of a vehicle body;
    an engine compartment accommodating the engine;
    a driving region formed rearwardly of the engine compartment;
    a step forming a portion of a lower side of the driving region;
    a frame structure disposed between the engine compartment and the driving region, the frame structure including:
        a partitioning portion partitioning between the engine compartment and the driving region and having an opening in a central portion thereof;
        a support frame portion extending vertically across the opening to reinforce the opening of the partitioning portion, said support frame portion forming a battery mounting face at the lower end level of said opening; and
        a mounting seat for a steering wheel disposed upwardly of the opening;
    a radiator disposed inside the engine compartment and rearwardly of the engine; and
    a radiator fan introducing outside air from said opening through said radiator, the outside air introduced by said radiator fan flowing through a circumference of a battery inserted through said battery mounting face.

12. The tractor as defined in claim 11, wherein said battery inserted in the battery support portion is accommodated with allowance in a space along the longitudinal direction of the vehicle body defined by a cross sectional area of said opening.

13. The tractor as defined in claim 12, wherein a front end portion of said battery is overlapped in a side view with said partitioning portion.

14. The tractor as defined in claim 11, wherein a steering controller is mounted on said mounting seat.

15. The tractor as defined in claim 11, wherein at lateral end regions of said partitioning portion, there is formed a recessed portion for allowing insertion therethrough of a hydraulic hose along the longitudinal direction.

* * * * *